United States Patent
Gillberg

(10) Patent No.: US 9,273,626 B2
(45) Date of Patent: Mar. 1, 2016

(54) POWER SWITCHING SYSTEM WITH CONTROL SIGNAL DRIVEN SUPPLY VOLTAGE

(71) Applicant: Fairchild Semiconductor Corporation, San Jose, CA (US)

(72) Inventor: James E. Gillberg, Flemington, NJ (US)

(73) Assignee: Fairchild Semiconductor Corporation, San Jose, CA (US)

( * ) Notice: Subject to any disclaimer, the term of this patent is extended or adjusted under 35 U.S.C. 154(b) by 585 days.

(21) Appl. No.: 13/726,726

(22) Filed: Dec. 26, 2012

(65) Prior Publication Data

US 2014/0117751 A1      May 1, 2014

Related U.S. Application Data

(60) Provisional application No. 61/720,567, filed on Oct. 31, 2012.

(51) Int. Cl.
| | |
|---|---|
| *H01H 47/00* | (2006.01) |
| *F02D 41/20* | (2006.01) |
| *F02P 15/02* | (2006.01) |
| *F02P 1/08* | (2006.01) |
| *H02M 1/00* | (2007.01) |

(52) U.S. Cl.
CPC ........ *F02D 41/20* (2013.01); *F02D 2041/2051* (2013.01); *F02D 2041/2062* (2013.01); *F02D 2041/2075* (2013.01); *F02P 1/08* (2013.01); *F02P 15/02* (2013.01); *H02M 2001/0006* (2013.01); *Y10T 307/826* (2015.04)

(58) Field of Classification Search
USPC .................................... 307/9.1, 125; 361/263
See application file for complete search history.

(56) References Cited

U.S. PATENT DOCUMENTS

| | | | | |
|---|---|---|---|---|
| 5,819,713 | A | * | 10/1998 | Kesler ........................... 123/630 |
| 2009/0161287 | A1 | * | 6/2009 | Kandah et al. ................ 361/263 |

OTHER PUBLICATIONS

Fairchild Semiconductor, ISL9V3040D3S / ISL9V3040S3S / ISL9V3040P3 / ISL9V3040S3 EcoSPARKTM 300Mj, 400v, N-Channel Ignition IGBT, Oct. 2004, 8 pages.

* cited by examiner

*Primary Examiner* — Danny Nguyen
(74) *Attorney, Agent, or Firm* — Grossman Tucker Perreault & Pfleger PLLC

(57) ABSTRACT

Generally, this disclosure provides systems and methods for a power switching system with a switching control circuit powered by a supply voltage derived from an input control signal. The system may include a power switch configured to electrically couple a device between a battery voltage and a ground, the device to be powered by the battery when the power switch is closed; a control circuit coupled to a gate port of the power switch, the control circuit configured to open and close the power switch by adjusting a gate driving signal provided to the gate port in response to a switching control signal provided to the control circuit; and a voltage conditioning circuit configured to generate a supply voltage based on the switching control signal, such that the supply voltage powers the control circuit.

22 Claims, 6 Drawing Sheets

POWER SWITCHING SYSTEM WITH CONTROL SIGNAL DRIVEN SUPPLY VOLTAGE

CROSS REFERENCE TO RELATED APPLICATIONS

This application claims the benefit of U.S. Provisional Application No. 61/720,567 filed Oct. 31, 2012, which is incorporated by reference herein in its entirety.

FIELD

The present disclosure relates to a power switching system, and more particularly, to a power switching system with a supply voltage derived from an input control signal.

BACKGROUND

Automotive ignition systems generally employ a power switching circuit that alternately makes and breaks an electrical connection from the battery, through an ignition coil to ground. The switching is typically based on a signal received from an engine control unit which is timed to fire the engine spark plugs as needed for operation of the engine. The switching circuit, which may be implemented as an integrated circuit (IC), requires a supply voltage to power the circuit and its constituent components. This supply voltage is generally provided by the vehicle battery and may therefore include high voltage transients, large voltage swings, high frequency noise and other artifacts that can be detrimental to the switching circuit.

Additional circuitry is therefore needed to protect the switching circuit IC from these voltage transients as well as from electrostatic discharge (ESD). The protection circuitry, which may include larger resistors and capacitors, can consume up to half of the IC area, or more, in some cases. This typically results in increased size and cost for the switching circuit IC and may adversely impact reliability if these harsh environmental conditions imposed by the battery are not adequately filtered by the protection circuitry.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for a power switching system with a switching control circuit. The power switching system may be configured to switch power, delivered from a battery, to an engine ignition coil based on an input control signal provided from an engine control unit or other external source. The switching control circuit may be powered by a supply voltage which is derived from the input control signal. The switching control circuit may include a voltage conditioning circuit configured to generate the supply voltage from the input control signal, eliminating the need to obtain a supply voltage from the battery as well as the need to provide associated filtering and protection from battery voltage transients.

In some embodiments, the power switching circuit may be configured to switch power to an electric motor or other vehicle components and the input control signal may be provided by an operator controlled switch or a vehicle computer system.

Figure 1:
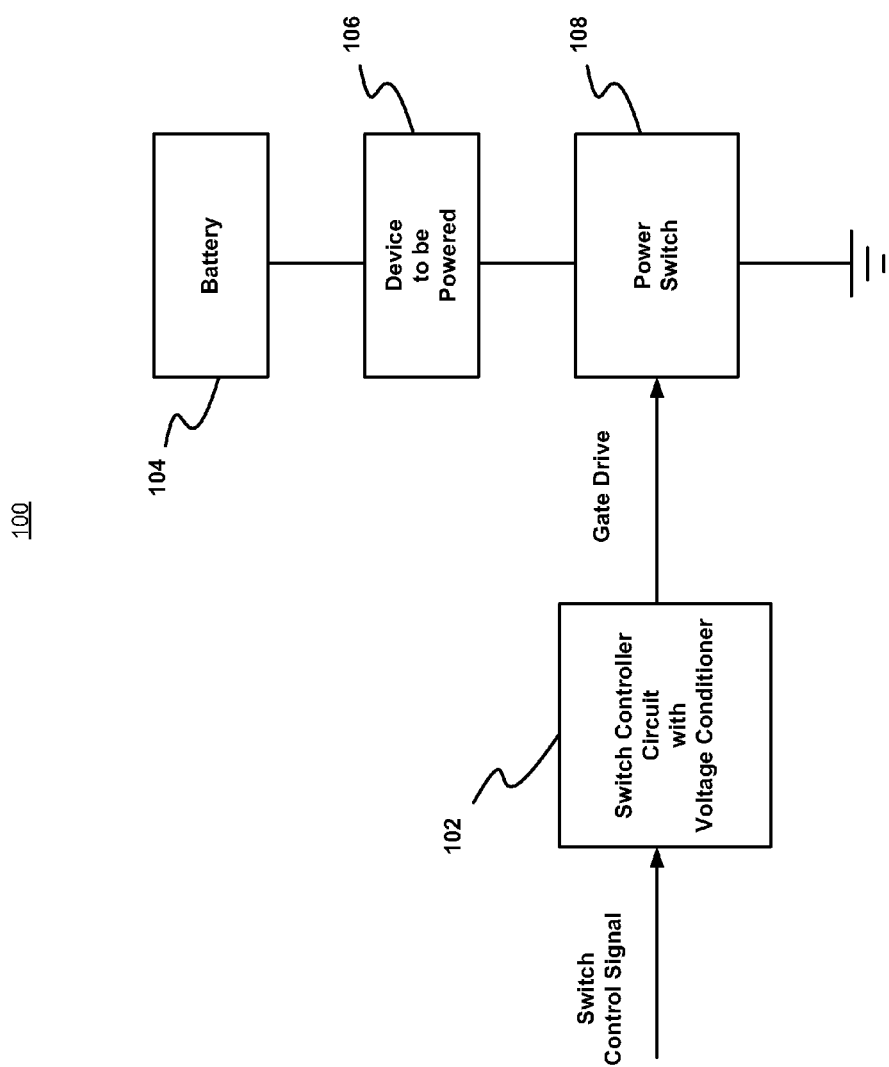
FIG. 1 illustrates a top level system diagram of one exemplary embodiment consistent with the present disclosure.

FIG. 1 illustrates a top level system diagram 100 of one exemplary embodiment consistent with the present disclosure. A device to be powered 106 may be electrically coupled between a battery 104 and a power switch 108. The power switch 108 is configured to selectively couple the device to be powered 106 to ground under the control of switch controller circuit 102. Switch controller circuit 102, with voltage conditioner, generates a gate drive signal that opens and closes power switch 108. The generation of the gate drive signal may be performed in response to a switch control signal which is provided to switch controller 102 from an external source. Switch controller circuit 102 is powered from a supply voltage that may be derived from the switch control signal input rather than from battery 104. The voltage conditioner component of switch control circuit 102 may be configured to generate the supply voltage based on the switch control signal input.

In some embodiments, the system 100 may be employed in an automobile or other type of vehicle that includes a combustion engine. The battery may be a 12 volt battery or any other type of battery suitable for the vehicle. The device to be powered may be an ignition coil (for example, the primary side of an ignition coil), a hot plug (for example in a diesel engine), a solenoid, an electric motor or any other type of device included in a vehicle that may need to be switched on and off or otherwise controlled. For example, the electric motor may be used to drive power windows, power brakes and/or power steering. The switch control signal may be provided by an engine control unit (for example, a spark timing signal), a vehicle computer system, a user/driver operated switch or any other source associated with the vehicle.

In some embodiments, switch controller circuit 102 and power switch 108 may be configured as integrated circuits (ICs). Power switch 108 may be an insulated gate bipolar transistor (IGBT) or an insulated gate metal oxide semiconductor field effect transistor (MOSFET). Power switch 108 may include a collector port and an emitter port through which current, flowing along the power path, enters and leaves the switch. Power switch 108 may also include a gate port through which the gate drive signal is applied to control the state of the switch (e.g., on or off, open or closed).

Figure 2:
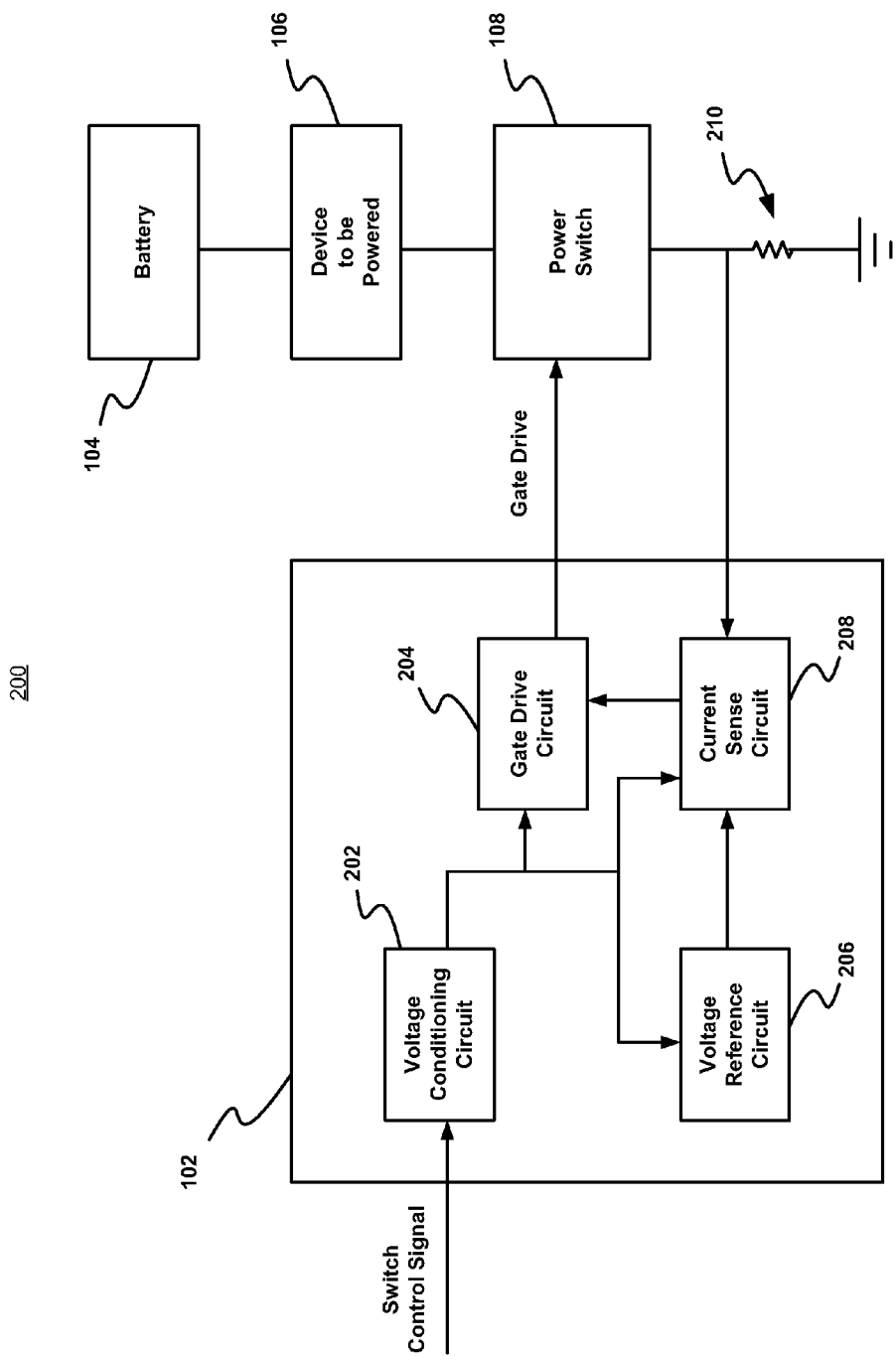
FIG. 2 illustrates a block diagram of one exemplary embodiment consistent with the present disclosure.

FIG. 2 illustrates a block diagram 200 of one exemplary embodiment consistent with the present disclosure. Switch controller circuit 102 is shown to include voltage conditioning circuit 202, gate drive circuit 204, voltage reference circuit 206 and current sense circuit 208. Current sense circuit 208 may be coupled to a current sense resistor 210 located in the power circuit path from battery 104 through device 106 and power switch 108 to ground.

Voltage conditioning circuit 202 may be configured to generate a supply voltage based on the switch control signal that is input to switch controller circuit 102. The supply voltage may be used to power the components of switch controller circuit 102. In some embodiments, the voltage conditioning circuit 202 may be a voltage clamp or a band gap reference voltage generator.

Current sense circuit 208 may be configured to sense current flow through power switch 108 from the collector port to the emitter port. In some embodiments this may be accomplished through current sense resistor 210 which may be configured in the power path to provide a voltage reading that is proportional to the current flow.

Voltage reference circuit 206 may be configured to generate a stable voltage reference (e.g., stable over variations in temperature and/or variations in control signal voltage, etc.) that may be used as a basis for comparisons with the sensed current from current sense circuit 208 to control gate drive circuit 204. Gate drive circuit 204 may be configured to adjust the gate drive signal to power switch 108 to turn the power switch on and off or to regulate the level of current flow through the power switch. The adjustments may be based on the switch control signal that is provided as input to the switch controller circuit and/or the comparison of the sensed current with the generated stable voltage reference.

In some embodiments, switch controller circuit 102 may also provide (not shown) thermal shutdown, current limiting and/or a maximum dwell time limiting function to protect the ignition coil.

Automotive batteries generally provide power in a harsh environment that includes significant positive and negative voltage transients, high frequency noise and electro-static discharge. A nominal 12 volt battery may vary from 6 to 24 volts during operation. Load dump can result in 130 volt swings in 400 milliseconds and field decay can reach −400 volts for 100 microseconds. As a result, any device receiving power from the battery or ignition circuit will generally need to be protected by voltage regulators, filters and other protection circuits. It will be appreciated that the provision of a supply voltage from the voltage conditioning circuit 202 to the components of the switch controller circuit 102 allows the switch controller circuit to function without drawing power from the battery. This eliminates the requirement for additional filtering and transient protection circuitry and the associated cost and space consumption.

Figure 3:
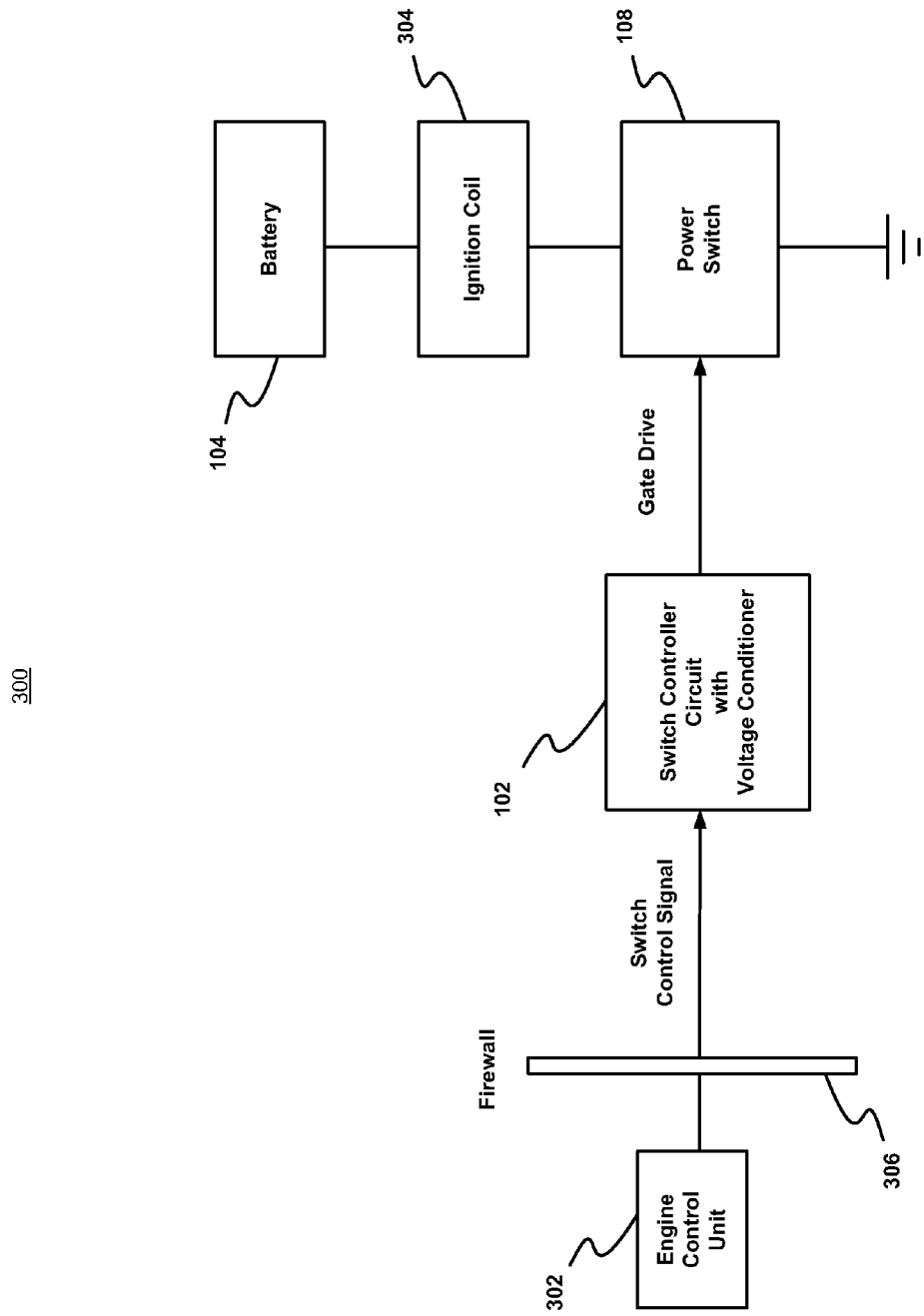
FIG. 3 illustrates a block diagram of another exemplary embodiment consistent with the present disclosure.

FIG. 3 illustrates a block diagram 300 of another exemplary embodiment consistent with the present disclosure. An engine control unit (ECU) 302 provides a switch control signal as input to a switch controller circuit with voltage conditioner 102. The ECU 302 may be separated from the switch controller circuit 102 by the vehicle's firewall 306 which may enable the ECU to generate a switch control signal with relatively lower electrical noise. The switch controller circuit 102, operating as described above, generates a gate drive signal that alternately opens and closes power switch 108 according to the timing of the ECU 302. Power switch 108 is illustrated in a low-side power drive configuration which may be preferable for driving an ignition coil. The alternating states of the power switch 108 allow the battery 104 to provide voltage and current pulses through the primary winding of ignition coil 304 which generates a higher voltage that creates spark for the vehicle engine.

Figure 4:
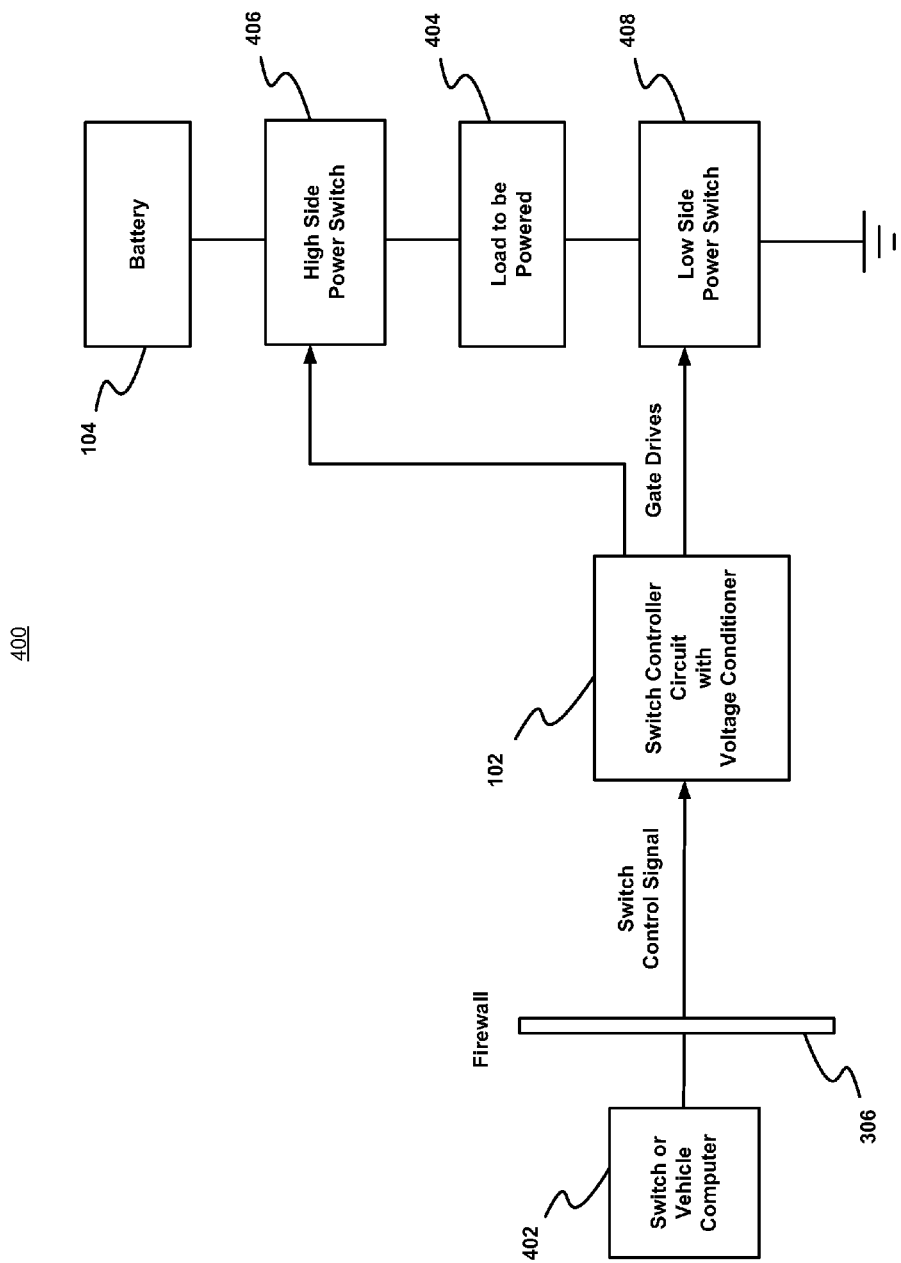
FIG. 4 illustrates a block diagram of another exemplary embodiment consistent with the present disclosure.

FIG. 4 illustrates a block diagram 400 of another exemplary embodiment consistent with the present disclosure. In this embodiment, a half bridge drive configuration is shown. Battery 104 provides power to a load 404 which may be, for example, a solenoid or a single directional motor. The signal to operate the load 404 may originate at an operator switch or vehicle computer 402 which may be separated from the engine compartment by vehicle firewall 306 which may enable the generation of a switch control signal with relatively lower electrical noise. The switch controller circuit 102, operating as described above, generates a gate drive signal that opens and closes low-side power switch 408 and high side power switch 406 based on the switch control signal. When power switches 406, 408 are closed, the circuit or power path from battery 104 to ground through the load 404 is completed enabling the powering or operation of the load. In some embodiments, the power path may be used for braking a motor or recirculation of current.

Figure 5:
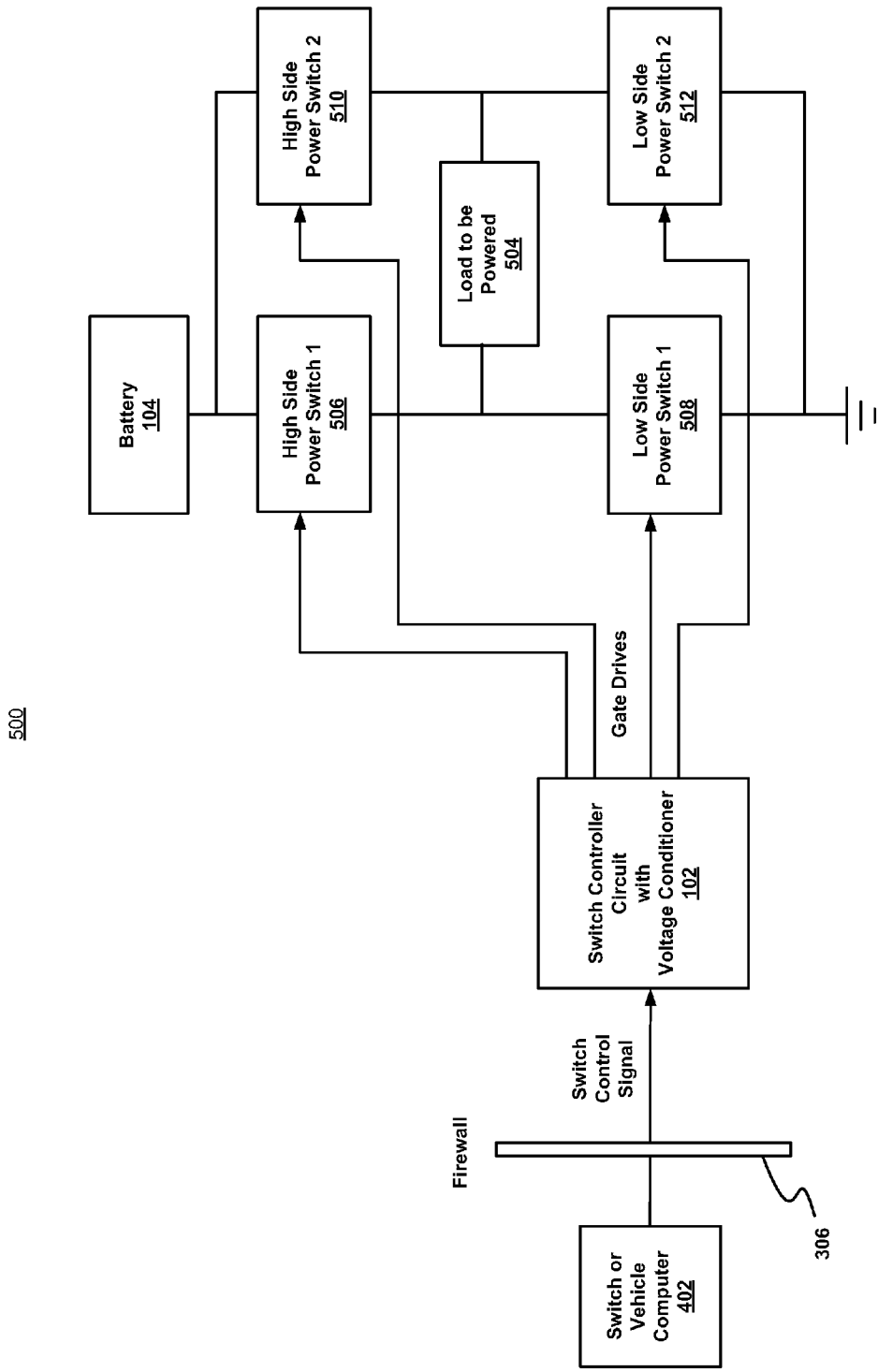
FIG. 5 illustrates a block diagram of another exemplary embodiment consistent with the present disclosure.

FIG. 5 illustrates a block diagram 500 of another exemplary embodiment consistent with the present disclosure. In this embodiment, a full bridge drive configuration is shown. Battery 104 provides power to a load 504 which may be, for example, a bi-directional motor, such as used for a power seat or power window. The signal to operate the load 504 may originate at an operator switch or vehicle computer 402 which may be separated from the engine compartment by vehicle firewall 306 which may enable the generation of a switch control signal with relatively lower electrical noise. The switch controller circuit 102, operating as described above, generates a gate drive signal that opens and closes low-side power switches 508, 512 and high side power switches 506, 510 based on the switch control signal. In response to the opening and closing of the power switches 506, 510, 508, 512 the circuit from battery 104 to ground through the load 504 may be completed in either of two power paths enabling the powering or operation of the load in a bi-directional manner.

Figure 6:
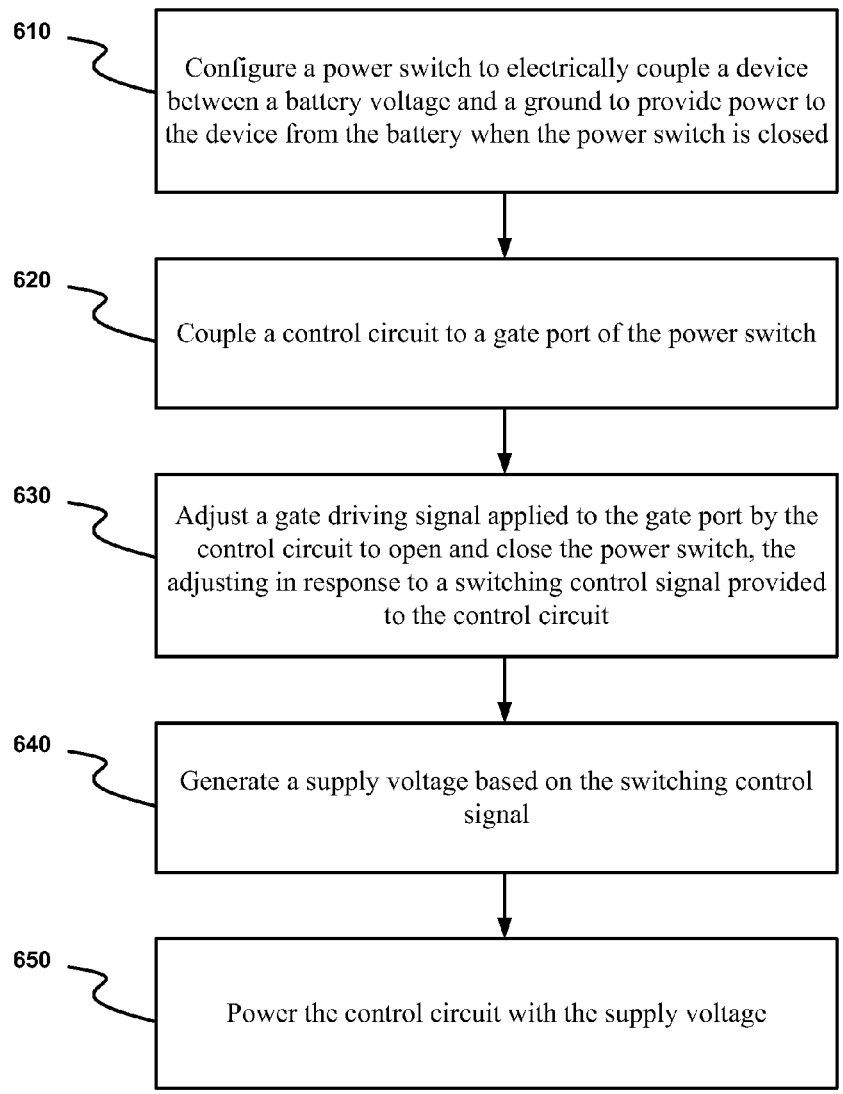
FIG. 6 illustrates a flowchart of operations of an exemplary embodiment consistent with the present disclosure.

FIG. 6 illustrates a flowchart of operations 600 of an exemplary embodiment consistent with the present disclosure. At operation 610, a power switch is configured to electrically couple a device between a battery voltage and a ground to provide power to the device from the battery when the power switch is closed. At operation 620, a control circuit is coupled to a gate port of the power switch. At operation 630, a gate driving signal is adjusted and applied to the gate port by the control circuit to open and close the power switch. The adjusting is performed in response to a switching control signal provided to the control circuit. At operation 640, a supply voltage is generated based on the switching control signal. At operation 650, the control circuit is powered by the supply voltage.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems and methods for a power switching system with a switching control circuit powered by a supply voltage derived from an input control signal.

The system may include a power switch configured to electrically couple a device between a battery voltage and a ground, the device to be powered by the battery when the power switch is closed. The system of this example may also include a control circuit coupled to a gate port of the power switch, the control circuit configured to open and close the power switch by adjusting a gate driving signal provided to the gate port in response to a switching control signal provided to the control circuit. The system of this example may further include a voltage conditioning circuit configured to generate a supply voltage based on the switching control signal, and the supply voltage powers the control circuit.

According to another aspect there is provided a system that may include an ignition coil coupled to a battery through a first terminal of the ignition coil. The system of this example may also include a power switch configured to couple a second terminal of the ignition coil to ground when the power switch is closed. The system of this example may further include a control circuit coupled to a gate port of the power switch, the control circuit configured to open and close the power switch by adjusting a gate driving signal provided to the gate port in response to a spark timing signal generated by an engine control unit. The system of this example may further include a voltage conditioning circuit configured to generate a supply voltage based on the switching control signal, and the supply voltage powers the control circuit.

According to another aspect there is provided a method. The method may include configuring a power switch to electrically couple a device between a battery voltage and a ground to provide power to the device from the battery when the power switch is closed. The method of this example may also include coupling a control circuit to a gate port of the power switch. The method of this example may further include adjusting a gate driving signal applied to the gate port by the control circuit to open and close the power switch, the adjusting in response to a switching control signal provided to the control circuit. The method of this example may further include generating a supply voltage based on the switching control signal. The method of this example may further include powering the control circuit with the supply voltage.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system comprising:
   a power switch configured to electrically couple a device between a battery voltage and a ground, said device to be powered by said battery when said power switch is closed;
   a control circuit coupled to a gate port of said power switch, said control circuit configured to open and close said power switch by adjusting a gate driving signal provided to said gate port in response to a switching control signal provided to said control circuit; and
   a voltage conditioning circuit configured to generate a supply voltage from said switching control signal, wherein said supply voltage powers said control circuit.

2. The system of claim 1, wherein said control circuit further comprises:
   a voltage reference circuit configured to generate a voltage reference signal;
   a current sense circuit configured to estimate current flow from a collector port of said power switch to an emitter port of said power switch; and
   a gate drive circuit configured to adjust said gate driving signal based on said switching control signal and further based on a comparison of said estimated current flow and said voltage reference signal.

3. The system of claim 1, wherein said power switch is an insulated gate bipolar transistor.

4. The system of claim 1, wherein said power switch is an insulated gate metal oxide semiconductor field effect transistor.

5. The system of claim 1, wherein said voltage conditioning circuit is a voltage clamp.

6. The system of claim 1, wherein said voltage conditioning circuit is a band gap reference voltage generator.

7. The system of claim 1, wherein said device to be powered is selected from the group consisting of an engine ignition coil, a hot plug and a solenoid driver.

8. The system of claim 1, wherein said switching control signal is a spark timing signal generated by an engine control unit.

9. The system of claim 1, wherein said device to be powered is an electric motor associated with a vehicle system selected from the group consisting of a power window system, a power steering system and a power braking system.

10. An ignition system comprising:
    an ignition coil coupled to a battery through a first terminal of said ignition coil;
    a power switch configured to couple a second terminal of said ignition coil to ground when said power switch is closed;
    a control circuit coupled to a gate port of said power switch, said control circuit configured to open and close said power switch by adjusting a gate driving signal provided to said gate port in response to a spark timing signal generated by an engine control unit; and
    a voltage conditioning circuit configured to generate a supply voltage from said switching control signal, wherein said supply voltage powers said control circuit.

11. The ignition system of claim 10, wherein said control circuit further comprises:
    a voltage reference circuit configured to generate a voltage reference signal;

a current sense circuit configured to estimate current flow from a collector port of said power switch to an emitter port of said power switch; and a gate drive circuit configured to adjust said gate driving signal based on said spark timing signal and further based on a comparison of said estimated current flow and said voltage reference signal.

12. The ignition system of claim 10, wherein said control circuit further comprises:

a dwell time detection circuit configured to detect a dwell time on said ignition coil that exceeds a maximum dwell time threshold; and a gate drive circuit configured to adjust said gate driving signal based on a response from said dwell time detection circuit.

13. The ignition system of claim 10, wherein said power switch is an insulated gate bipolar transistor.

14. The ignition system of claim 10, wherein said power switch is an insulated gate metal oxide semiconductor field effect transistor.

15. The ignition system of claim 10, wherein said voltage conditioning circuit is a voltage clamp.

16. The ignition system of claim 10, wherein said voltage conditioning circuit is a band gap reference voltage generator.

17. A method comprising:

configuring a power switch to electrically couple a device between a battery voltage and a ground to provide power to said device from said battery when said power switch is closed;

coupling a control circuit to a gate port of said power switch;

adjusting a gate driving signal applied to said gate port by said control circuit to open and close said power switch, said adjusting in response to a switching control signal provided to said control circuit;

generating a supply voltage from said switching control signal; and powering said control circuit with said supply voltage.

18. The method of claim 17 further comprising:

generating a voltage reference signal;

estimating current flow from a collector port of said power switch to an emitter port of said power switch; and adjust said gate driving signal based on said switching control signal and further based on a comparison of said estimated current flow and said voltage reference signal.

19. The method of claim 17, wherein said generating of a supply voltage further comprises applying a voltage clamp to said switching control signal.

20. The method of claim 17, wherein said generating of a supply voltage further comprises driving a band gap reference voltage generator from said switching control signal.

21. The method of claim 17, wherein said device to be powered is selected from the group consisting of an engine ignition coil, a hot plug and a solenoid driver.

22. The method of claim 17, wherein said switching control signal is a spark timing signal generated by an engine control unit.

* * * * *